United States Patent
Wilks et al.

(10) Patent No.: US 9,465,111 B2
(45) Date of Patent: Oct. 11, 2016

(54) TIME-OF-FLIGHT CAMERA WITH SIGNAL PATH MONITORING

(75) Inventors: Ralph Wilks, Meckenbeuren (DE); Bernd Damhofer, Tettnang (DE)

(73) Assignee: IFM ELECTRONIC GMBH (DE)

(*) Notice: Subject to any disclaimer, the term of this patent is extended or adjusted under 35 U.S.C. 154(b) by 299 days.

(21) Appl. No.: 14/127,665

(22) PCT Filed: Aug. 3, 2012

(86) PCT No.: PCT/EP2012/065230
§ 371 (c)(1),
(2), (4) Date: Dec. 19, 2013

(87) PCT Pub. No.: WO2013/026679
PCT Pub. Date: Feb. 28, 2013

(65) Prior Publication Data
US 2014/0152813 A1   Jun. 5, 2014

(30) Foreign Application Priority Data
Aug. 25, 2011  (DE) .................. 10 2011 081 561

(51) Int. Cl.
| | | |
|---|---|---|
| H04N 7/18 | (2006.01) | |
| G01S 17/36 | (2006.01) | |
| G01S 17/89 | (2006.01) | |
| G01S 7/491 | (2006.01) | |
| G01S 7/497 | (2006.01) | |

(52) U.S. Cl.
CPC .............. *G01S 17/36* (2013.01); *G01S 7/491* (2013.01); *G01S 7/497* (2013.01); *G01S 17/89* (2013.01); *G01S 2007/4975* (2013.01)

(58) Field of Classification Search
None
See application file for complete search history.

(56) References Cited

U.S. PATENT DOCUMENTS

| | | |
|---|---|---|
| 7,995,191 B1 | 8/2011 | Sandusky |
| 2002/0172514 A1 | 11/2002 | Gabello et al. |
| 2005/0232460 A1 | 10/2005 | Schmiz et al. |
| 2008/0180650 A1* | 7/2008 | Lamesch ............ H04N 13/0253 356/5.01 |
| 2010/0007548 A1 | 1/2010 | Kuenzler et al. |
| 2011/0018967 A1 | 1/2011 | Mirbach et al. |

FOREIGN PATENT DOCUMENTS

WO    2008/067952 A1    6/2008

OTHER PUBLICATIONS

International Search Report—PCT/EP2012/065230—International File Date: Aug. 3, 2012; IFM Electronic GMBH; 3 pgs.

* cited by examiner

*Primary Examiner* — Sath V Perungavoor
*Assistant Examiner* — Dakshesh Parikh
(74) *Attorney, Agent, or Firm* — Schmeiser, Olsen & Watts, LLP

(57) ABSTRACT

A time-of-flight camera, having a time-of-flight sensor, which has at least one receiving pixel and is configured as a photomixing detector, having an illumination means, and having a modulator, which is connected to the time-of-flight sensor and to the illumination means, wherein a control sensor is arranged in the region of the illumination means such that at least some of the radiation emitted by the illumination means can be received by the control sensor is provided.

8 Claims, 7 Drawing Sheets

TIME-OF-FLIGHT CAMERA WITH SIGNAL PATH MONITORING

FIELD OF TECHNOLOGY

Figure 1:
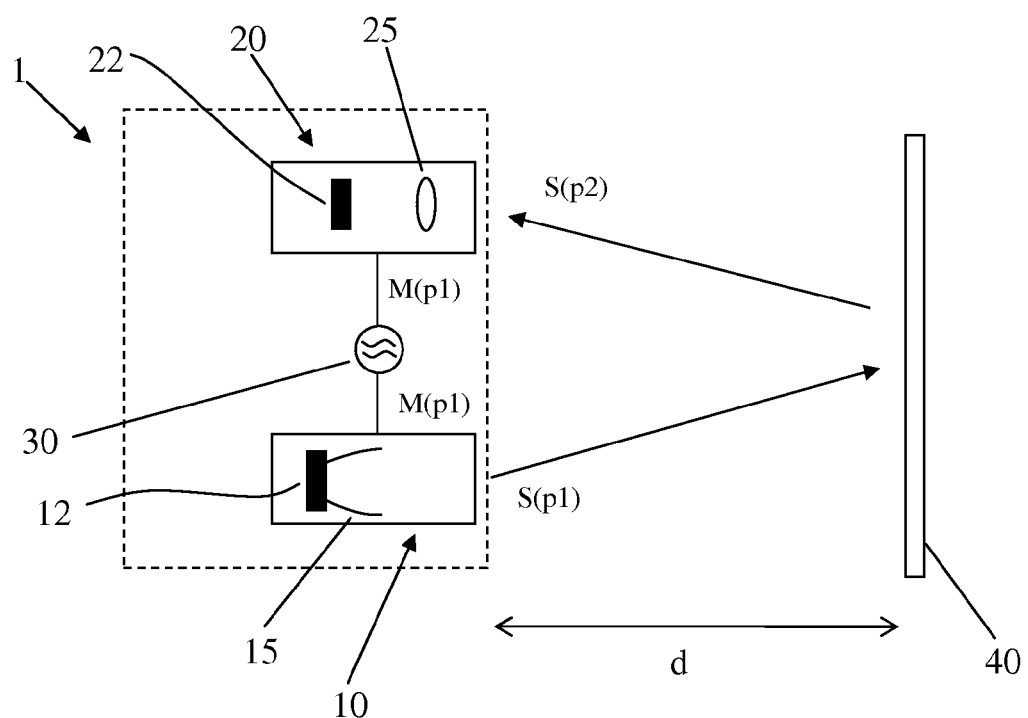

The following relates to a time-of-flight camera system and a method for operating such a system. The invention is in particular used for monitoring the complete signal path, as is required for safety-related applications—by way of example for SIL, ASIL.

BACKGROUND

For safety-related applications, it must at all times be ensured that the camera detects if a component is not operating according to the specifications.

The group of time-of-flight camera systems not only comprises systems that determine the distances directly from the light travel time, but in particular also all light travel time, or 3D TOF camera systems, which acquire light travel time data from the phase shift of emitted and received radiation. Photonic mixer devices (PMD) are especially suitable as light travel time or 3D TOF cameras, as they are described in the applications EP 1 777 747, U.S. Pat. No. 6,587,186 and also DE 197 04 496 and others, and are available, for example from "ifm electronic gmbh" as the frame grabber 03D. The PMD camera in particular allows a flexible arrangement of the light source and of the detector, which can be arranged in a housing as well as separately. Of course, cameras or devices with at least one receiving pixel should also be included in the term camera, or camera system, like the applicant's distance measuring device OID.

SUMMARY

An aspect relates to further developing the device with regard to function or signal path monitoring.

A time-of-flight camera system is advantageously provided with a light travel time sensor having at least one receiving pixel, an illumination source for emitting a modulated light, with a modulator for generating a modulation signal, the modulator being connected to the light travel time sensor and to the illumination source, and a backlight driver for operating the illumination source as a function of the applied modulation signal. The backlight driver is configured such that a control signal is available at the control output of the backlight driver which characterizes a time waveform of a driver signal.

This method makes it possible, in particular, to monitor a signal path between the time-of-flight camera and a separate illumination module via an independent channel signal.

Likewise an advantageous method is provided for the time-of-flight camera system in which a phase is determined by mixing the control signal of the backlight driver and the modulation signal of the modulator.

The determination of the phase of the control signal in relation to the modulation signal allows a far-reaching monitoring of the function of the entire time-of-flight camera system. If, for example, the phase of the control signal is outside a tolerance range, it is possible, on the one hand, to initiate an error response, or, on the other hand, to adjust the distance measurement within certain admissible limits according to the determined phase shift.

The time-of-flight camera system preferably has an electrical mixer, which is connected to the modulator as well as to the control output of the backlight driver, and is configured to electrically mix the control and modulation signal.

The time-of-flight camera system preferably has at least one control light source which can be operated as a function of the control signal of the backlight driver, a first control light source being provided for the illumination of a reference travel time sensor and a second control light source for the illumination of a light travel time sensor.

This method has the advantage that, by way of example, the light travel time sensor can be illuminated in the control measuring phase and tested for functionality on the basis of a control signal of the light travel time sensor. The control signal can likewise illuminate a reference travel time sensor via the control light source, so that phase signals can also be detected at the light travel time sensor while a distance is being measured, and the quality of the phase measurement, for example, can be monitored in this way.

In another embodiment, a control sensor is arranged in the region of the illumination source such that at least part of the radiation emitted by the illumination source can be received by the control sensor.

By means of this control sensor, it is advantageously possible to check if radiation is indeed emitted from the illumination source.

A further embodiment of this method provides that the light intensity of the illumination source is determined by the output signal of the control sensor.

Another embodiment of the method advantageously provides for operating at least one control light source as a function of the control signal of the backlight driver, or of the output signal of the control sensor, the at least one control light source illuminating the light travel time sensor and/or the reference light travel time sensor.

The phase and the intensity of the light are advantageously determined on the basis of the control signals and evaluated by an evaluation unit during at least one distance measuring interval.

It is also preferable to provide a first control and/or a second control light which is/are operated as a function of control signals of the backlight driver.

BRIEF DESCRIPTION

The invention will hereinafter be explained in more detail on the basis of exemplary embodiments with reference to the drawings.

Figure 2:
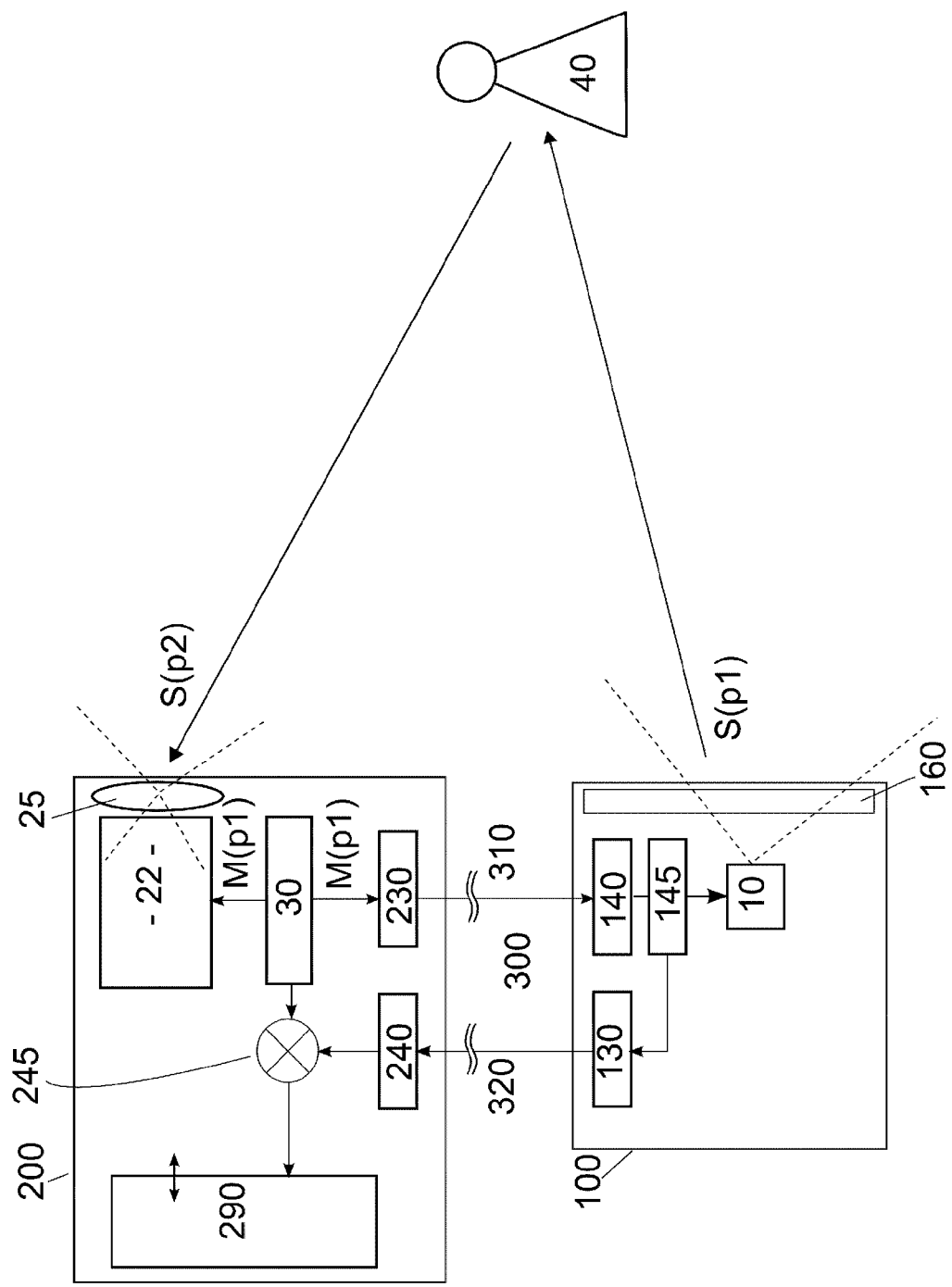
Figure 3:
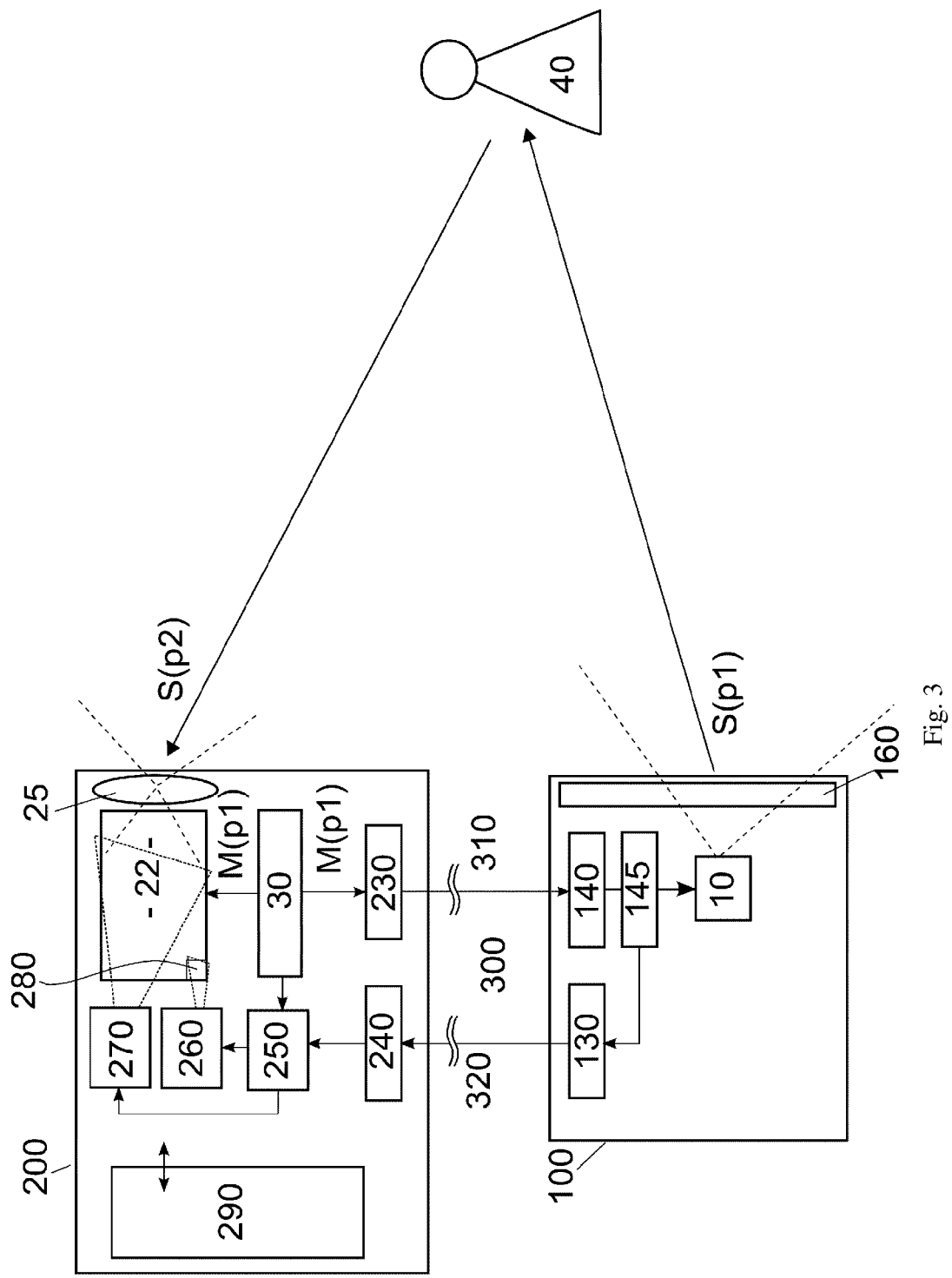
Figure 4:
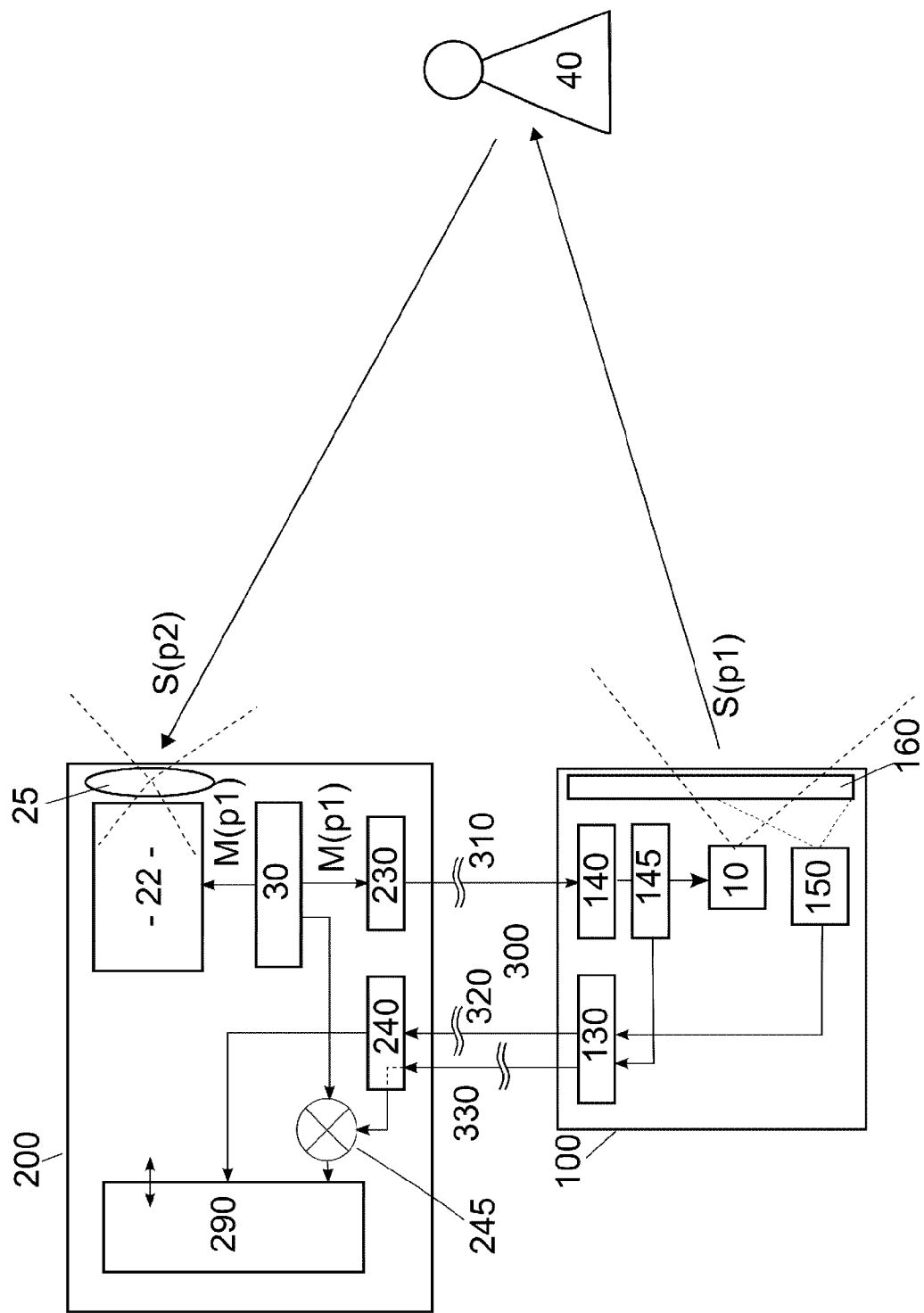
Figure 5:
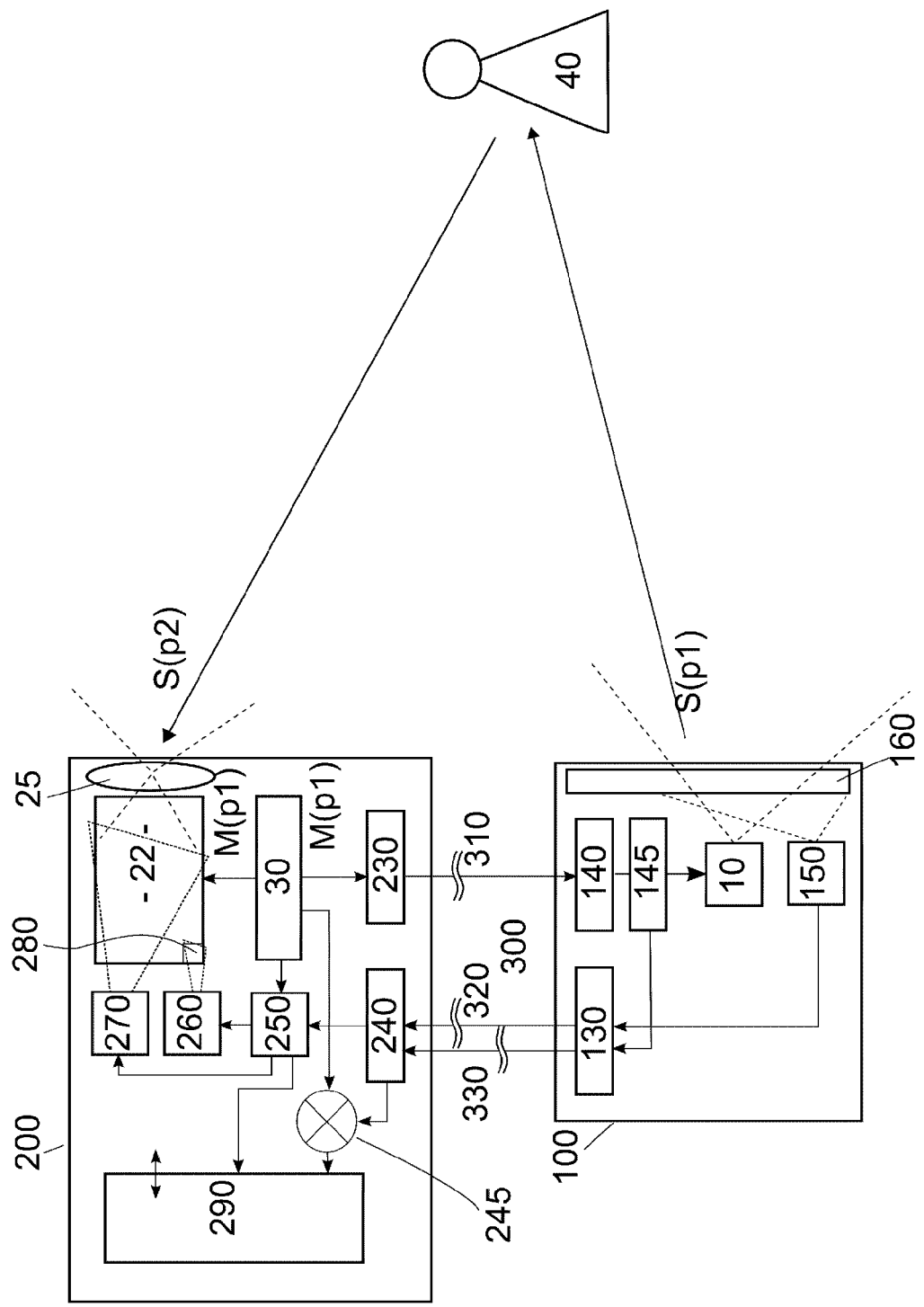
Figure 6:
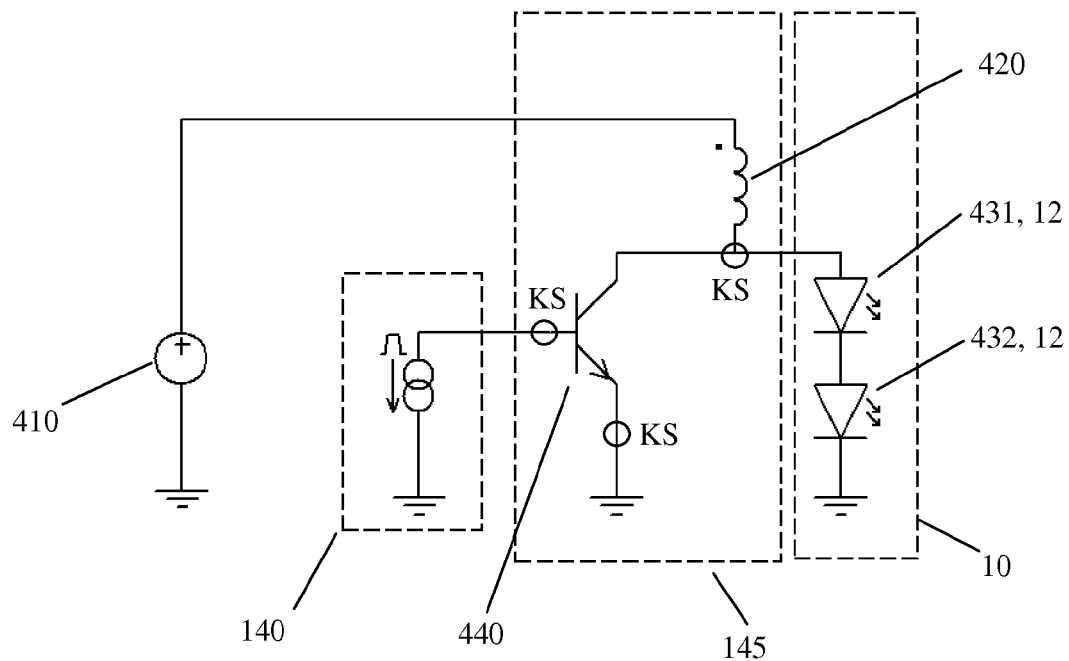
Figure 7:
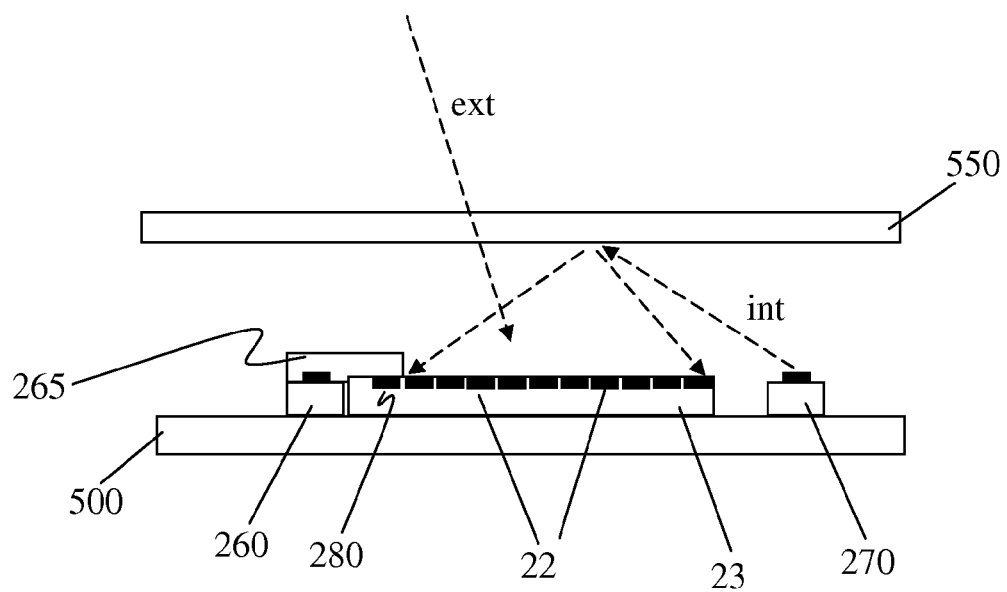
Figure 8:
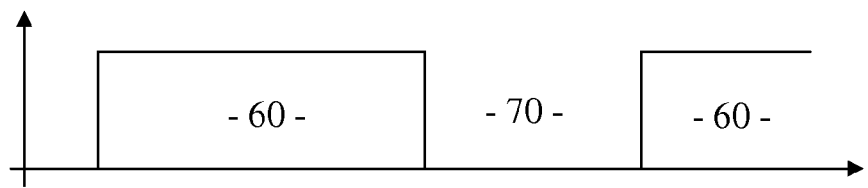
Figure 8:
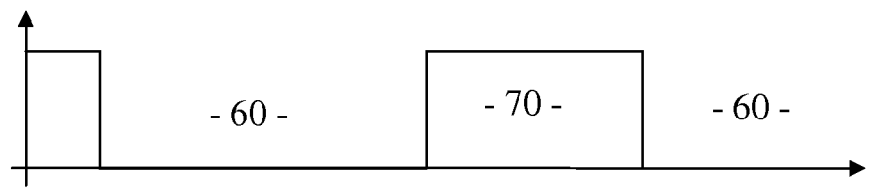
Figure 9:
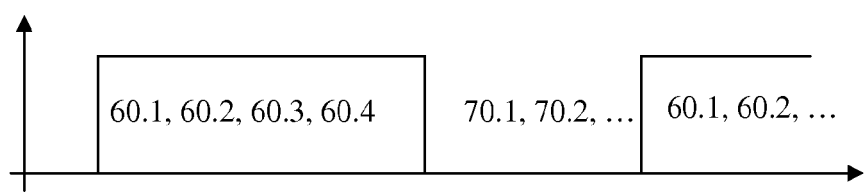
Figure 10:
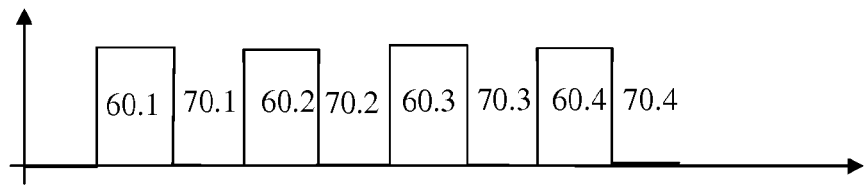

They schematically show:

FIG. 1 the basic principle of a time-of-flight camera according to the PMD principle, FIG. 2 a light travel time camera system with an electrical mixer, FIG. 3 a time-of-flight camera system with a PMD mixer, FIG. 4 a time-of-flight camera system with an electrical mixer and a control sensor, FIG. 5 a system with electrical mixer, control sensor and PMD mixer, FIG. 6 a backlight driver FIG. 7 a possible arrangement of a control light source, FIG. 8 a possible measurement sequence with distance and control measurement intervals, FIG. 9 a possible measurement sequence with multiple phase measurements in a measurement interval FIG. 10 a possible measurement procedure with one phase measurement per measurement interval.

DETAILED DESCRIPTION

In the following description of the preferred embodiments, the same reference numerals refer to the same or to comparable components.

FIG. 1 shows a measuring situation for an optical distance measurement with a time-of-flight camera, as it is known, for example, from DE 197 04 496.

The time-of-flight camera system 1 comprises a transmitting unit or an illumination module 10, 100 including an illumination source 12 and an associated beam forming optical system 15 as well as a receiving unit or time-of-flight camera 20 with a receiving optical system 25 and a light travel time sensor 22. The light travel time photosensor 22, or the light travel time sensor 22, has at least one pixel, however preferentially a pixel array, and is in particular configured as a PMD sensor. The receiving optical system 25 typically consists of a plurality of optical elements to improve the imaging properties. The beam forming optical system 15 of the transmitting unit 10 is preferentially configured as a reflector.

The measurement principle of this arrangement is essentially based on the phase shift of the emitted and received light; thus the travel time and the distance covered by the received light can be determined. For this purpose, the light source 12 and the light travel time photosensor 22 are jointly supplied with a defined modulation frequency M(p1) with a first phase position p1 via a modulator 30. The light source 12 emits an amplitude modulated signal S(p1) with the first phase position p1 in accordance with the modulation frequency. In the illustrated case, this signal or electromagnetic radiation is reflected by an object 40 and, owing to the covered distance, correspondingly collides, phase-shifted with a second phase position p2, as a receiving signal S(p2) on the light travel time photosensor 22. The modulation signal M(p1) is mixed with the received signal S(p2) in the light travel time sensor 22, the distance of the object being determined from the resulting signal of the phase shift, or the distance d of the object.

FIG. 2 shows a time-of-flight camera system 1 according to the present invention, in which the transmitting and receiving unit 10, 20 are arranged in a separate lighting module 100 and in a separate camera module 200. The modulator 30 generates a periodic modulation signal M(p1), preferentially in signal packets of a few microseconds to a few milliseconds length and a frequency in the megahertz range. Both the light travel time sensor 22 and a signal driver 230 are supplied with the modulation signal M(p1).

The camera module and the illumination module 200, 100 are connected to one another via a signal cable 300. The signals of the signal driver 230 are transmitted via the transmission channel (forward channel) 310 to the signal receiver 130 of the illumination module 100. In a preferred embodiment this is realized by means of an electrical LVDS signal (low voltage differential signaling). However, other electrical or also optical modes of transmission are conceivable.

The signal is received by the signal receiver 140 in the illumination module 100 and processed for the illumination source 12 via a backlight driver 145, which then emits a corresponding light signal S(p1) in a first phase position p1. In a preferred embodiment, the light signal passes through a predominantly transparent cover plate 160 and illuminates the scene or objects 40 relevant to the measurement. The objects 40 reflect part of the light signal back to the camera 200 which is received there by the light travel time sensor 22. As already described, the distance from the object is determined for each receiving pixel from the phase shift of the light signal.

According to the present invention, in addition to determining the distance, it is now possible to monitor the functionality of the signal transmission or signal processing.

For this purpose, the backlight driver 145 is configured such that a control signal is available at the control output of the backlight driver 145 which characterizes a time waveform of a driver signal. As will later be shown in FIG. 6, the driver signal can be picked up at different taps inside the driver. It is essential for an adequate pick-up that the picked up electrical signal substantially corresponds with the driver signal with which the illumination source is also driven. Depending on the quality of the driver signal, this signal can either be used directly as a control signal or converted into an appropriate electrical value for an appropriate signal transmission.

This control signal is processed by means of a signal driver 130 for the transmission of signals and transmitted by means of the signal cable 300 to the receiving unit 240 of the camera module 200 via a transmission channel (return channel) 320. In this case for example, the return channel 320 can also be transmitted on the same signal cable 320 via an LVDS signal.

Other modes of transmission are also conceivable; the same mode of transmission need not necessarily be used by the forward and return channel. Depending on the application, the transmission of the signals can be digital or also analog. Of course, processing for signal transmission can also already be performed in the backlight driver 145.

Depending on the application, different information about the control signal can be transmitted. For easy signal monitoring, it might be sufficient to only transmit the switch-on and/or switch-off edges of the control signal, while the amplitude can also be digitally transmitted for a detailed error analysis, if necessary.

Digital transmission of signals is usually more susceptible to interferences compared to a purely analog transmission. Nevertheless, it can be quite useful to realize the forward and/or return channel analogically for certain applications.

The signal received by the signal receiver 240 via the return channel 320 is applied to a first signal input of a consecutive mixer 245. The second signal input is supplied with the modulation signal M(p1) of the modulator 30. The output signal of the mixer substantially corresponds to the phase shift of both input signals and can be evaluated by the consecutive evaluation unit 290. The evaluation unit is connected to further components of the time-of-flight camera system, in particular to the light travel time sensor 22, and can possibly initiate further responses as a function of the phase detected by the mixer 245.

FIG. 3 shows another embodiment, in which, in contrast to the exemplary embodiment according to FIG. 2, the control signal is not directed to a mixer 245, but to a first and second control light source 260, 270 via a switch 250. The control light sources 260, 270 are arranged such that the first control light source 260 can illuminate a reference travel time sensor 280 and the second control light source 270 can illuminate the light travel time sensor 22. During distance measurements, in which the light travel time sensor 22 is illuminated by a light reflected by the object 40, the reference travel time sensor 280 can be modulated in parallel via the first control light source 260 as a function of the control signal. If no control signal is present during the distance measurement, or if the phase of the control system is outside a tolerance range, then a malfunction of the system can be analyzed or a corresponding error response can be activated, for example, via the evaluation unit 290.

With a functioning illumination source 12 or signal chain or signal path, a correspondingly modulated control signal will be provided by the backlight driver 145, so that an error-free signal can be detected by the reference light travel time sensor 280. Small tolerated phase deviations, which, by way of example, can occur due to the temperature or aging of the light sources, can be compensated if required.

Another embodiment according to the present invention provides for performing additional control measurements after measuring the distance. During these control measurements, when no distance is measured, it is also possible to illuminate the entire light travel time sensor 22 with the second control light source 270, and optionally also the reference light travel time sensor 280. This control measurement is also used for monitoring the light travel time sensor 22 as such, including the read-out and evaluation procedures. The light travel time sensor 22 is preferably not illuminated uniformly, but non-uniformly, so that each pixel is substantially measured for other information, for example, another brightness level. By means of such a method, it is also possible to monitor if all pixels are correctly read-out. It is possible, for example, to signal a malfunction and/or initiate appropriate error responses in case of deviations outside a tolerance range or above or below the tolerance limit.

FIG. 4 shows another variant of the exemplary embodiment according to FIG. 2, in which a control sensor 150 is arranged in the illumination module 100 such that part of the light emitted by the illumination source can be received by the control sensor 150. In a preferred embodiment, the control sensor is a photodiode, which receives its light signal, for example, from the reflection of the light emitted by the illumination source on a light transmissive frontal cover plate 160 of the illumination module. A light reception via direct visualization of the control sensor 150 on the illumination source 12 or by using other appropriate optical elements, like mirrors or light conductors, for example, is also conceivable.

The control sensor 150 preferentially provides an analog output signal as a signal which is transmitted via the signal driver 130, appropriately processed via the return channel 320, to the receiving unit 240 of the camera module 200. For example, the return channel can also be transmitted as an LVDS signal in this case. Other modes of transmission are also conceivable; in particular, the signal can also be transmitted in the form of modulation via the LVDS signal line 300. A control signal of the backlight driver 145 is also transmitted to the receiving unit 240 of the camera module 200 via the signal driver 130 in parallel to the output signal of the control sensor 150. The receiving unit 240 preferably directs the control signal to the mixer 245 and the output signal of the control sensor 150 directly to the evaluation unit 290.

This embodiment has the advantage that the phase of the illumination signal can be evaluated independently of the illumination amplitude via the mixer 245, whereas the light intensity of the illumination source 12 can be evaluated directly via a separate channel by the evaluation unit. Phase and amplitude are thus transmitted and evaluated via independent transmission paths.

FIG. 5 shows another configuration of the embodiment according to FIG. 4, in which, in addition to the separate detection of the amplitude and phase of the illumination source, the output signal of the control sensor and/or the control signal of the backlight driver can be applied to the first and second control light source 260, 270 via the switch.

The sequence of a reference measurement and/or control measurement is preferentially stored in a program of the evaluation unit 290 or in the camera. Furthermore, the measurements can be designed such that, for example, the camera or the camera system or the light travel time sensor 22 can be aligned therewith. The time required for the control measurement can be selected to be substantially shorter than the time required for measuring the distance, because the light intensity need not be used to illuminate the environment, but only to generate a signal for control measurement. The amount of light generated by the second control light source 270 should preferably be greater than the amount of the ambient light.

The reference light travel time sensor 280 and/or the light travel time sensor 22 need not necessarily be illuminated directly by the first and/or second control light source 260, 270, but can also be indirectly illuminated, by way of example, by the reflection from a cover glass of the receiving optical system 25 or other surfaces or components inside the camera.

The wavelengths of the control light sources 260, 270 can further be different from one another and/or differ from the wavelength of the illumination source 12. In this way, in an advantageous embodiment, it would be possible for the second control light source 270 to illuminate both the light travel time sensor 22 and the reference light travel time sensor 280 via appropriate optical elements, e.g. interference filters, the first control light source 260, however, illuminating only the reference light travel time sensor 280. A separation of the reference light travel time sensor 280 from the externally incoming light signal would advantageously be possible as an alternative, e.g., to optical apertures.

FIG. 6 shows a possible embodiment of a backlight driver 145. The light source 12 is constructed in the illustrated example with two light emitting diodes 431, 432 connected in series. The anode of the first diode 431 is connected via a coil 420 to the positive terminal of a voltage source 410, and the cathode of the second diode 432 to a reference potential, in particular ground. The negative terminal of the voltage source 410 is also connected to the reference potential. A transistor 440 is arranged parallel to the light source 12 or to the light emitting diodes 431, 432 connected in series, said transistor 440 being electrically connected with one terminal to the coil 420 and the anode of the first light emitting diode 432, and with another terminal to the reference potential. The control terminal of the transistor 440 is connected to the modulator 30 or signal receiver 140. For synchronization of the illumination phase and the dark phase with the receiving unit 200, the signal of the modulator 30 with which the switch is biased, is to be inverted and/or phase-shifted if necessary.

Instead of a transistor, also comparable switching means can be used as switches, in particular bipolar transistors, MOS-FETs, etc.

When operating the circuit, the transistor 440 is alternately switched on and off via the clock 30 so that the current flowing through the coil 420 flows one time through the transistor 440 and another time through the light source 12.

When switching on the transistor, the current flowing through the coil 420 builds up a magnetic field in the coil. A quasi-current is predetermined by the energy stored in the magnetic field, which is available when turning off the transistor or opening the switch of the light source.

Put simply, an appropriate flux voltage will set up on the basis of the previously generated current according to the characteristic of the light source 12 or light-emitting diodes 431, 432 after opening the switch.

Or, in another approach, when opening the switch, the voltage induced in the coil will increase up to a flux voltage which allows current to flow through the light source 12 at the level of the previously generated current.

The flux voltage is the voltage applied to the anode of the first light emitting diode 431.

The illumination phase is thus initiated by opening the switch or transistor 440, the light source 12 being essentially supplied by the energy stored in the coil. If the inductance is selected to be sufficiently high, the current or the emitted light intensity of the LEDs will only insignificantly decrease.

The inductance is preferentially selected to be so high that the current or the emitted light intensity can be considered to be substantially constant in the illumination phase.

Whereas parasitic inductances of the light source prevent a rapid increase of the current due to a limited feeding voltage by means of serial switching, the upstream inductance or coil 420, however, makes it possible to maintain the previously generated current by providing a higher induction voltage.

When the switch is closed or the transistor is switched closed, the current again flows through the switch. The energy provided by the inductance in the illumination phase or in the switch-off phase of the transistor is then returned to the inductance.

An appropriate driver or control signal can be picked up at various points inside the backlight driver 145. Tap points around the switching transistor 440 base, emitter, or collector are preferentially suitable. These possible tapping points are identified with KS in FIG. 6. The tap at the base is in particular suitable to monitor a satisfactory signal transmission up to the backlight driver 145. The tapping points at the collector and at the emitter, however, also indicate if the transistor 440 switches the current. Based on certain switch-on and/or switch-off characteristics, it is optionally also possible to see if the illumination source functions correctly.

The driver signal tapped at a tapping point KS can optionally be used directly as a control signal; otherwise the driver signal can be converted in a known manner via a converter, for example, into a signal that is suitable as a control signal. By way of example, voltage converters, but also analog to digital converters can be taken into consideration.

With an appropriate embodiment, the functionality of the signal path and of the illumination source can thus already be checked by means of the electrical control signal of the backlight driver 145 alone. In order to achieve a higher level of reliability it is advantageous to redundantly and diversely check the illumination source 12 via the control sensor 150 mentioned above.

When using a fast photodiode as a control sensor 150, not only can the amplitude, but also the modulation frequency be scanned via the control sensor 150. Thus, it is then possible in an exemplary embodiment according to FIG. 4 or 5 to apply the electrical control signal as well as the electrical output signal of the control sensor to the electrical mixer 245.

FIG. 7 is an example of a possible arrangement according to the present invention of relevant components in the region of the light travel time sensor 22. The first control light source 260, a light travel time sensor component 23, and the second control light source 270 are consecutively arranged on a component holder 500. In the illustrated example, the light travel time sensor component 23 holds both the light travel time sensor 22 for distance measurements and the reference light travel time sensor 280.

The reference light travel time sensor 280 in the illustrated example is characterized in that at least the light sensitive range of the reference light travel time sensor 280 is connected to the light emitting surface of the first control light source 260 via a light conductor channel 265. The light conductor channel 265 is preferentially configured such that no significant radiation can escape. As a result of this method, the first control light source 260 and the reference light travel time sensor 280 are optically connected to one another.

In the present case, a transparent cover glass 550 is arranged on the side opposite the components 22, 23, 270. External radiation (ext) or light that is useful for measuring the light travel time can essentially pass freely through the cover glass 550. During operation, the control light source 270 emits light in the direction of the cover glass 550. Part of the internal light (int) will pass through the cover glass 550 to the outside; another part will be reflected on the cover glass 550 and reach the photosensitive layer of the light travel time sensor 22 where it can be detected.

The illustrated cover glass 550 is only an example of the means to project the control light source 270 onto the light travel time sensor 22. Instead of or also complementary to the cover glass, a reflective surface can basically be used, which allows an at least indirect illumination of the light travel time sensor 22. It is also conceivable that the inner surfaces of the camera casing as such are sufficient as reflective surfaces.

It is, of course, also conceivable to arrange the control light source in the housing such that the light travel time sensor 22 can be illuminated directly by the control light source 270.

Regardless of the arrangement in detail, it should, however, be ensured that the externally penetrating light (ext) can be ignored compared to the internal light (int) during control measurement or signal path monitoring.

In a preferred embodiment just one pixel or a pixel array 280 of the existing light travel time sensor 22 is taken for the reference measurements. This method has the advantage that the electrical and physical behavior of the reference selected in this way virtually identically reflects the behavior of the remaining "measuring" light travel time sensor 22.

In another advantageous embodiment it is also conceivable to construct the reference light travel time sensor 280 independently on the light travel time sensor component 23 or also as a separate component.

FIG. 8 shows the chronological sequence of a distance measurement 60 and a control measurement 70. In the time interval of the distance measurement one or also several distance measurements can be made, for example, if necessary, a distance measurement can initially also be limited to only one single phase measurement. There is a break after a distance measurement interval 60, during which a control measurement 70 can be made. Relatively long integration times of the light travel time sensor 22 are necessary in the distance measurement interval 60 due to the typically low light intensity of the received useful signal. As the internal light of the second control light source 270 is preferentially applied with a high intensity to the light travel time sensor 22, shorter integration times can be used as a rule for the control measurement. Furthermore, the number of control measurements can also be reduced to one, if necessary, so that in total the control interval 70 can overall be kept considerably shorter in time than the distance measurement interval 60.

FIG. 9 shows another exemplary embodiment in which several phase measurements are provided in the distance measurement interval 60, during which the illumination source is operated in different phase positions or phase shifts 60.1, 60.2, 60.3 60.4—for example at approximately 0°, 90°, 180° and 270°. A reliable distance or distance value is obtained, for example, on the basis of these measurements.

The phase position of the illumination source is typically shifted relative to the modulation phase of the light travel time sensor 22. But basically, the modulation phase of the light travel time sensor 22 can also be shifted relative to the phase position of the illumination source.

According to the present invention, during the control measurement 70, measurements are also taken at different phase shifts 70.1, 70.2, . . . .

Switching between distance measurement 60 and control measurement 70 is preferably initiated by the modulator 30. Typically, the functions which control switching and/or phase shifts are also stored in the modulator 30. Depending on the function performed or planned in the modulator 30, for example, the switch 250 can be controlled, or the illumination source 12 be operated with a phase-shifted signal.

Alternatively, these functions can at least in part also be stored in the evaluation unit 290 or the switch 250 is already part of the evaluation unit 290.

As is shown in FIG. 10 the control measurement 70 can also possibly be taken directly after or before a phase measurement 60.1, 60.2, . . . .

Furthermore, it is also conceivable that additionally or alternatively to the actual signal path monitoring or control measurement a modulation signal is directly supplied to one of the control light sources 260, 270. This method has the advantage that, for example, in case of a signal path recognized as faulty, another error analysis can be performed, while the light travel time sensor 22 or the reference light travel time sensor 280 can be illuminated with modulated light without switching on the illumination source 12. If the sensor 22, 280 operates free of error in such a case, a defective illumination source 12 or a defective signal path in the direction of the illumination source should be assumed.

Furthermore, it can be provided that the evaluation unit 290 or the modulator 30 provides special test signals for a test operation. This test operation could be integrated into a control and/or reference measurement or into a separate test interval.

For such an additional control measurement or test measurement, for example, a sequence of phase shifts could be provided that should ultimately lead to a specifically measured sequence of travel times or distance values. If the results differ from those expected, different responses can be triggered depending on the magnitude of the deviations. In case of a still tolerable deviation, the light travel time sensor 22 or the evaluation algorithm could be calibrated, for example. For instance, if the deviation is outside the permitted tolerance, an error signal can be created.

Other test signals with special properties in terms of amplitude and frequency, in particular also constant amplitude, are conceivable.

Based on the results during the control and/or reference measurement, the light travel time or distance values acquired in the distance measurement interval can be evaluated, for example. The values of the distance measurement can be checked for plausibility, corrected and/or weighted or discarded in accordance with the results of the parallel reference measurements. Of course, one or more of the preceding or subsequent control measurements can be also used for this purpose.

In a second embodiment, it can further be provided to reduce the beam power of the illumination source 12 during the control measurement such that the energy consumption of the system can be reduced. The power can be easily reduced because no light reflected by an external object is necessary for the signal path monitoring, but it should only be ensured that the control sensor 150 receives sufficient light from the illumination source 12.

The invention has been mainly explained in the exemplary embodiments described above with reference to a PMD time-of-flight camera. Of course, the invention is not limited to this type of light travel time measurement.

The invention can also easily be transferred to other variants of light travel time determination or cameras which determine distance data or three-dimensional environmental information on the basis of light travel times.

An illumination source and a light travel time sensor to receive the useful light reflected by the object is also provided for the direct determination of light travel time, as provided in the case of a PMD camera. In the same way, the illumination source can be monitored with the control sensor according to the present invention and the light travel time sensor can be illuminated with the control light sources according to the present invention.

The term "modulated light" should in this respect also include the typically "pulsed light" for direct light travel time measurement. The described modulator should therefore also be considered in terms of a pulse generator or also as a pulse width modulator.

The modulator can accordingly also be designed as a clock for the relevant components of a corresponding light travel time measurement.

The embodiment according to FIG. 2 primarily relates to a time-of-flight camera 1 which is divided in two separate modules, namely an illumination and a camera module 100, 200. The use of a signal cable 300 and the use of signal drivers 130, 230 and signal receivers 140, 240 is taken primarily into consideration for this application.

If the illumination source and camera 100, 200 are included in one housing, this signal chain consisting of driver and receiver is not absolutely necessary, although it can definitely be used. It can preferably be disregarded when a common housing is used, and the signals of the control sensor can be directly applied to the switch 250 or to the control light sources 260, 270.

In particular other variants are conceivable in the embodiment. By way of example, it can thus also be provided that the control sensor 150 in the proximity of the illumination source 12 performs the function of the reference light travel time sensor.

It is also conceivable that the reference light travel time sensor is not illuminated by the first control light source 260, but indirectly or directly by the illumination source 12.

REFERENCE NUMERALS

10 Transmitting Unit
12 Illumination Source
100 Illumination Module
124 Emitted Light
126 Directly Received Light
130 Signal Driver (E.G. Modulation Driver for Lvds)
140 Signal Receiver
145 Backlight Driver
150 Control Sensor
200 Camera Module
20 Receiving Unit
22 Light Travel Time Sensor
23 Light Travel Time Sensor Component
230 Signal Driver
240 Signal Receiver 245 Mixer
250 Signal Switch
260 First Light Control Source
265 Light Channel
270 Second Control Light Source
280 Reference Light Travel Time Sensor, Reference Pixel, Reference Pixel Structure
290 Evaluation Unit
25 Receiver Optics for Useful Light
30 Modulator, Modulation Generator
300 Signal Cable
310 Transmission Channel A (Forward Channel)
320 Transmission Channel B (Return Channel)
410 Voltage Source
420 Coil
431 First Diode
432 Second Diode
440 Control Terminal Transistor
40 Object
500 Component Holder
550 Cover Glass, Reflective Surface
60 Distance Measurement
70 Control Measurement

The invention claimed is:

1. A time-of-flight camera system comprising:
a light travel time sensor, having at least one receiving pixel;
an illumination source for emitting of modulated light;
a modulator for generating a modulation signal, connected to the light travel time sensor and to the illumination source; and
a backlight driver for operating the illumination source as a function of the applied modulation signal;
wherein the backlight driver is configured such that a control signal is available at a control output of the backlight driver, which characterizes a time waveform of a driver signal;
wherein at least one control light source is operated as a function of the control signal of the backlight driver.

2. The time-of-flight camera system according to claim 1, having an electrical mixer, which is connected to the modulator and to the control output of the backlight driver, and configured to electrically mix the control and modulation signal.

3. The time-of-flight camera system according to claim 1, wherein a first control light source is provided for the illumination of a reference travel time sensor and a second control light source is provided for the illumination of the light travel time sensor.

4. The time-of-flight camera system according to claim 1, wherein a control sensor is arranged in a region of the illumination source such that at least part of the radiation emitted by the illumination source is received by the control sensor.

5. A method for operating the time-of-flight camera system according to claim 1, comprising:
determining a phase by mixing a control signal of the backlight driver and the modulation signal of the modulator;
wherein at least one control light source is operated as a function of the backlight driver, and the control light source illuminates the light travel time sensor and/or a reference light travel time sensor.

6. The method according to claim 5, wherein a light intensity is determined on the basis of the output signal of a control sensor.

7. The method according to claim 5, wherein at least during a distance measuring interval, the phase and the light intensity are determined and evaluated by an evaluation unit.

8. The method according to claim 5, wherein during a control measurement interval a first and/or second control light is operated on the basis of the control signals of the backlight driver.

* * * * *